Figure 1:
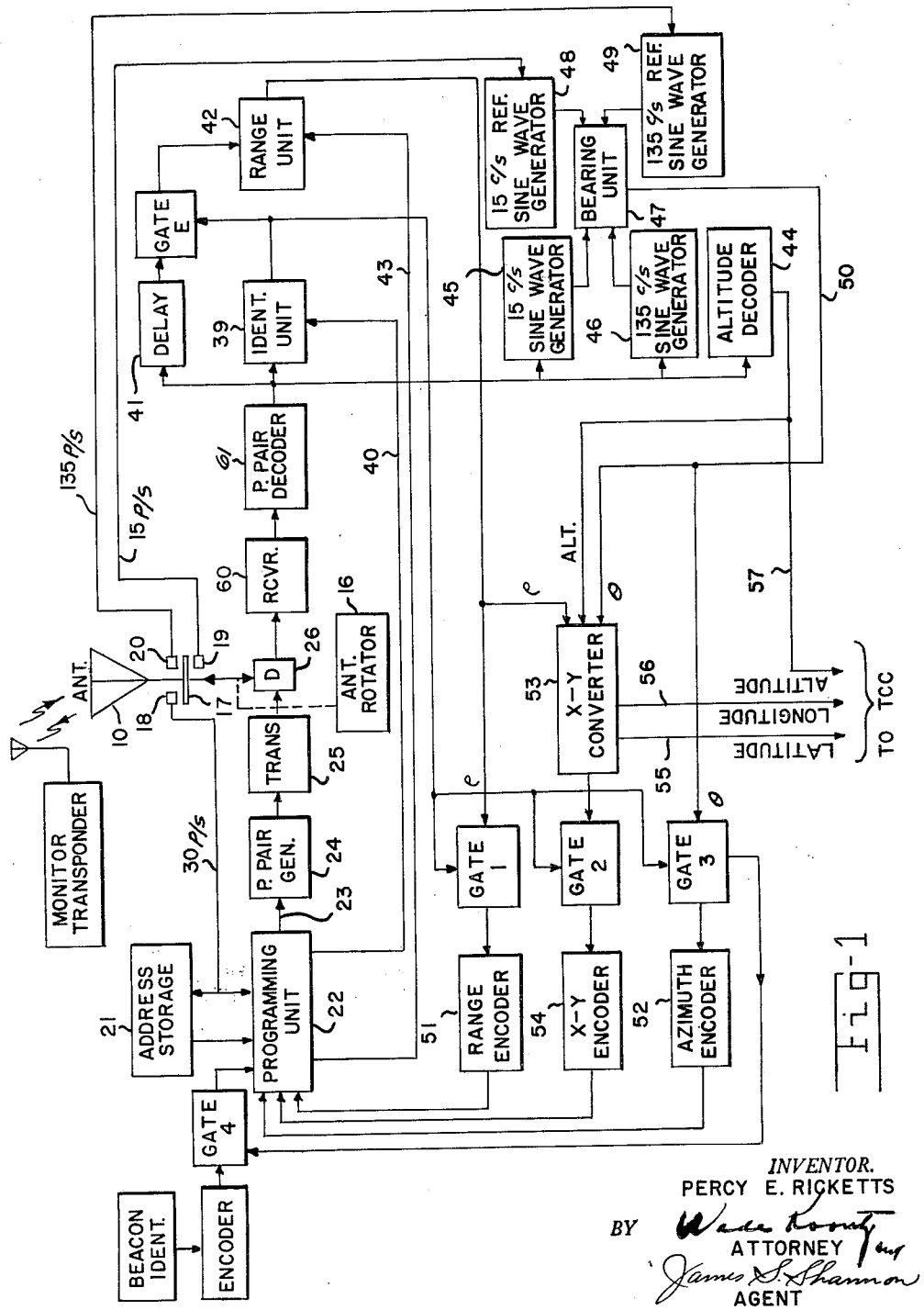

Sept. 18, 1962 P. E. RICKETTS 3,055,001
AIR TRAFFIC CONTROL SYSTEM
Filed June 26, 1959 3 Sheets-Sheet 2

INVENTOR.
PERCY E. RICKETTS
BY
ATTORNEY
AGENT

Sept. 18, 1962 P. E. RICKETTS 3,055,001
AIR TRAFFIC CONTROL SYSTEM

Filed June 26, 1959 3 Sheets-Sheet 3

TIME ⟶
GROUND TRANS. ------
AIR TRANS. ―――
SILENCE xxxx

*INVENTOR.*
PERCY E. RICKETTS
BY
ATTORNEY
AGENT

3,055,001
AIR TRAFFIC CONTROL SYSTEM
Percy E. Ricketts, Absecon, N.J., assignor to the United States of America as represented by the Secretary of the Air Force
Filed June 26, 1959, Ser. No. 823,266
4 Claims. (Cl. 343—6.5)
(Granted under Title 35, U.S. Code (1952), sec. 266)

The invention described herein may be manufactured and used by or for the United States Government for governmental purposes without payment to me of any royalty thereon.

The purpose of this invention is to provide an air traffic control system employing the techniques used in the TACAN (Tactical Air Navigation) system, but transferring the functions of range and bearing determination from the airborne station to the ground station. This results in a more economical and reliable arrangement, since a single installation makes these determinations for all aircraft, and simplifies the airborne equipment.

The TACAN system is described in Electrical Communications, volume 33, Number 1, March 1956. Considered briefly, the system comprises a responder beacon located on the ground and an interrogating transmitter-receiver, together with range and bearing measuring equipment in each aircraft. The ground beacon comprises an antenna coupled through a duplexer to the input of a receiver and the output of a transmitter. The output from the receiver is used to trigger the transmitter which produces a pulse of fixed magnitude and duration each time it is triggered. In this manner, interrogating pulses from the airborne transmitters produce reply pulses from the beacon. However, the output of the beacon transmitter is not limited to outputs due to interrogating pulses. Instead, the beacon transmitter is operated on a constant duty cycle principle in which the number of output pulses is held substantially constant at about 2700 per second. This is accomplished by automatically controlling the gain of the beacon receiver as a function of the transmitter output pulse rate. Normally, the interrogating rate is below 2700 per second. In this case the sensitivity of the receiver is increased automatically to the point where the number of noise generated pulses is sufficient to make up the difference. Any tendency for the transmitter output to depart from a rate of 2700 pulses per second is opposed by a change in receiver sensitivity to increase or decrease the number of noise generated filler pulses as required. Filler pulses are required to attain the 2700 pulse per second rate until the number of interrogating aircraft reaches about 100. The effect of an increase in the number of interrogating aircraft over this figure is automatically countered through a lowering of the sensitivity of the receiver sufficiently that the transmitter response is limited to the 100 strongest interrogating signals. The relatively constant output pulse rate is required for the bearing measuring process which will be discussed later.

Range is determined at the aircraft in the TACAN system by measuring the elapsed time between the radiation of an interrogating pulse by the airborne transmitter and the reception of a reply from the beacon, taking into account the fixed system delays. All interrogations are on the same frequency and all replies are on the same different frequency. Interference is prevented by the application of a random "jitter" to the interrogating pulses and by the use of a stroboscopic search process which selects return pulses that occur at a fixed or very slowly varying interval from the transmitted pulse.

The bearing of the aircraft is determined at the aircraft in the TACAN system by a phase comparison process between waves derived from the 2700 pulse per second signal received from the ground beacon. The beacon antenna consists of a vertical omni-directional radiator around which revolve a single vertical parasitic element at a short radius and nine equally spaced vertical parasitic elements at a longer radius. All parasitic elements revolve together at 15 r.p.s. The overall effect is to produce an antenna pattern in the form of a rotating cardioid having a 9-cycle sinuous outline. As the result of this rotating pattern the pulse signal of the beacon received at the aircraft has an amplitude modulation containing a 15 c./s. component and a 9×15 or 135 c./s. component, the phases of which depend upon the bearing of the aircarft relative to some reference direction through the beacon. The modulation produced does not exceed 30% so that the distance measuring pulses previously mentioned are not seriously weakened. The beacon also radiates a pulse each time the cardioid points in a predetermined reference direction and a pulse for each 40° of rotation of the antenna. These pulses, which have repetition rates of 15 and 135 per second respectively, are received by the airborne receiver and converted into 15 c./s. and 135 c./s. reference waves. The airborne apparatus determines the aircraft's bearing by comparing the phases of the previously mentioned 15 c./s. and 35 c./s. waves with the reference waves, the phases of which are independent of aircraft bearing. The 15 c./s. signal is used to resolve the 9-fold ambiguity of the 135 c./s. signal. Since the 135 c./s. signal completes a full cycle in 40° of rotation of the beacon antenna, a change of 1° in aircraft bearing produces a 9° change in th phase of the 135 c./s. signal.

The air traffic control system in accordance with the invention utilizes the beacon antenna and the range and bearing determining techniques of the above described TACAN system. The range and bearing equipments, however, are located at the ground beacon so that the same equipments make the range and bearing determinations for all aircraft. Each aircraft is provided with a numerical address and provision is made at each ground station for storing the addresses of all aircraft under surveillance of that station. The aircraft are interrogated in succession through a continuous roll call of the stored addresses. Each interrogating signal consists of a synchronizing pulse, the address of the aircraft to be interrogated and a DME (distance measuring equipment) pulse. Each aircraft is equipped with a transponder which operates when interrogated with the correct address to radiate a reply transmission consisting of a DME pulse, the aircraft address, the aircraft altitude and sufficient additional pulses to permit the ground station to generate the 15 c./s. and 135 c./s. bearing determining waves, the reference waves of these frequencies being obtained directly from the ground antenna mechanism. The bearing determining waves are generated through an amplitude modulation of the received pulses by the antenna pattern. When the range and bearing have been determined, these, along with the beacon identification, are transmitted to the aircraft. In place of range and bearing from the ground station, the position of the aircraft in rectangular coordinates may be transmitted, in which case the beacon identification is not required. A cycle for a single aircraft can be completed in one-half revolution of the beacon antenna permitting, at 15 r.p.s., 30 aircraft interrogations per second.

An airway may comprise a number of beacons which may all operate on the same frequency channel by time sequencing. As an aircraft progresses along the airway its address is transferred to successive beacons.

Figure 2:
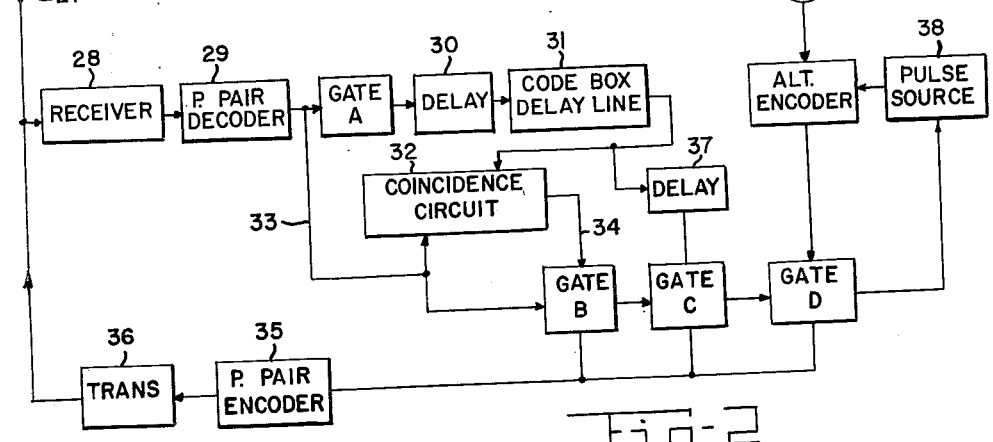
Figure 3:
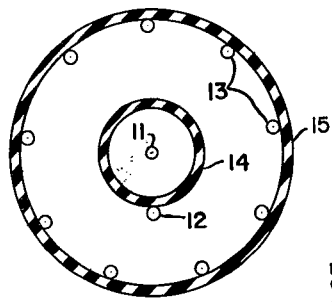
Figure 4:
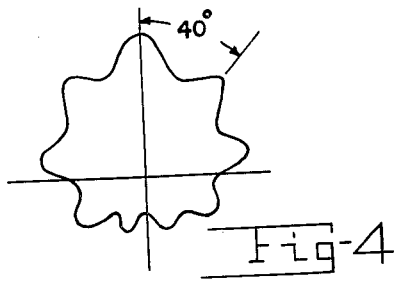
Figure 6:
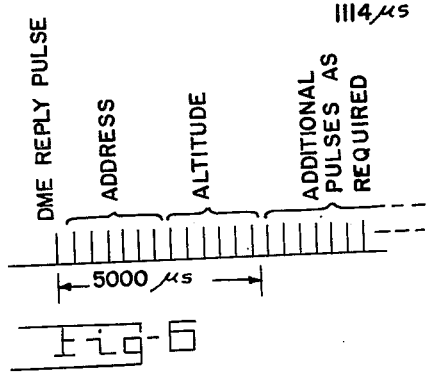
Figure 7:
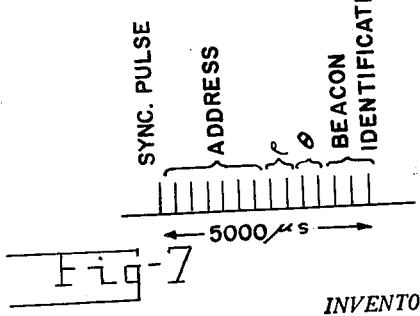
Figure 8:
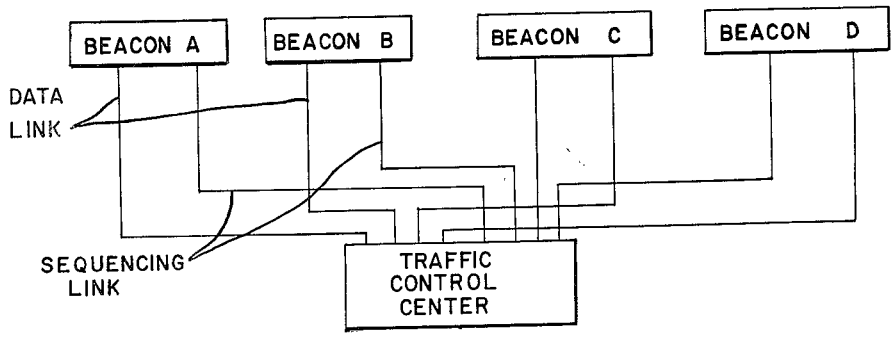
Figure 9:
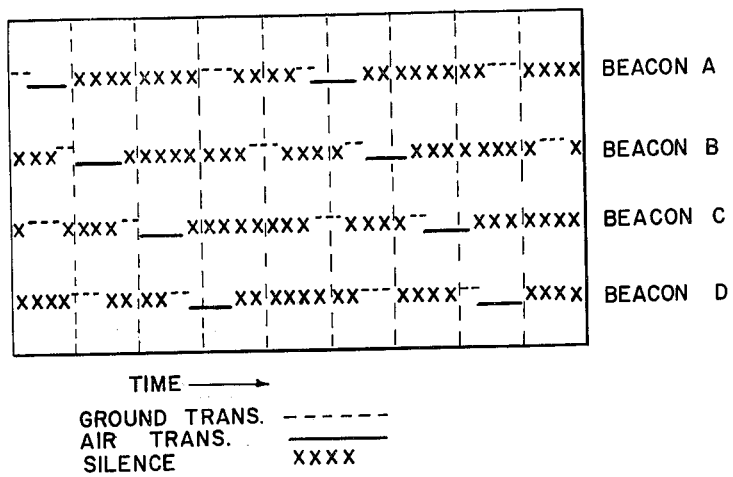

A more detailed description of the invention will be given with reference to the specific embodiment thereof shown in the accompanying drawings in which FIG. 1 is a block diagram of a ground beacon in accordance with the invention, FIG. 2 is a block diagram of the airborne equipment, FIG. 3 is a cross section of the beacon antenna, FIG. 4 illustrates the beacon antenna horizontal pattern, FIG. 5 illustrates the interrogating signal from beacon to aircraft, FIG. 6 illustrates the aircraft reply signal, FIG. 7 illustrates beacon to aircraft information signal, FIG. 8 illustrates the relationship between beacons and traffic control center in an airway, and FIG. 9 illustrates a sequencing pattern for the beacons making up an airway.

Referring to FIG. 1, the antenna 10 of the beacon is constructed as illustrated in the horizontal cross section of FIG. 3. The antenna consists of a driven vertical stationary element 11, an inner vertical parasitic element 12 and nine equally spaced outer vertical parasitic elements 13. The parasitic elements are supported by cylindrical insulating members 14 and 15 which rotate together about element 11 as a center at 15 r.p.s. The horizontal pattern of the antenna is shown in FIG. 4 and, as seen, is a cardioid having a sinuous outline of nine complete cycles.

Returning to FIG. 1 the antenna, the rotation of which is produced by a motor or other suitable drive 16, also carries a rotating pulser plate 17. The pulser plate is made of non-magnetic material and carries a number of permanent magnets which cooperate with pickup coils 18, 19 and 20, to produce a voltage pulse each time a magnet passes by one of the coils. By this method pickup 18 has a pulse induced in it for each 180° of rotation of antenna 10. These are referred to as "start" pulses and each serves to initiate an interrogation cycle for one of the controlled aircraft.

The addresses, in electrical binary code, of all controlled aircraft are stored in address storage element 21 and are fed in a repeating sequence, one for each "start" pulse or 30 per second, to the programming unit 22. The programming unit times and sequences the signal transmissions from the beacon. Following application of a "start" pulse to the programming unit 22, the unit produces in its output circuit 23 a serial pulse signal consisting of a synchronizing pulse, the address of the aircraft to be interrogated and a DME (distance measuring equipment) pulse. This signal is illustrated in FIG. 5 and has a duration of about 1114 microseconds.

The output signal of the programming unit is applied to pulse pair generator 24 where each pulse is converted into a pair of pulses of predetermined spacing. The pulse pair encoded signal is then applied to transmitter 25, the output of which feeds antenna 10 through duplexer 26. Referring to FIG. 2, the radiated interrogating signal is received by antenna 27 and receiver 28 of the airborne equipment and the pulse pair encoded output of the receiver is reduced by pulse pair decoder 29 to the original signal illustrated in FIG. 5. The pulse pair technique is used to greatly reduce the likelihood of responses to interfering signals and noise since an output from decoder 29 will be produced only when the applied pulses have the correct spacing.

When the synchronizing pulse, which is the first pulse in the output of decoder 29, is applied to gate A, this gate is opened by the synchronizing pulse for a sufficient length of time to permit the synchronizing pulse only to pass. After a timing delay by element 30, the synchronizing pulse is applied to code box delay line 31 which converts this pulse into a serial pulse binary code representing the aircraft address. This address code is applied to coincidence circuit 32 as is also, over circuit 33, the address code in the received signal. By proper choice of the delay produced by element 30, these two addresses may be made to arrive at the coincidence circuit simultaneously and, if they are in agreement, an output pulse is produced in circuit 34 which opens gate B. The opening of gate B permits the DME pulse of the received signal to pass gate B and be applied to pulse pair encoder 35 for encoding and transmission back to the beacon through transmitter 36 and antenna 27. After the DME pulse has passed, gate B closes and gate C opens allowing the aircraft address generated by element 31 and appropriately delayed by element 37 to be applied to pulse pair encoder 35. When the address has passed, gate C closes and gate D opens. The altitude of the aircraft in binary pulse code then passes through gate D to the input of encoder 35. Following the altitude code additional pulses from source 38 may be allowed to pass gate D in order to lengthen the aircraft reply as required for proper operation of the 15 c./s. and 135 c./s. sine wave generators 45 and 46 (FIG. 1) as explained later. Gate D is a monostable circuit which is triggered from its stable state to its unstable state when gate C closes and remains in its unstable state, in which state the gate is open, for a predetermined period of time as governed by the circuit constants. This period of time is made equal to time required to pass the altitude code pulses and the required additional pulses. Pulse source 38 may be started and stopped in coincidence with the opening and closing of gate D. The aircraft reply signal, as it appears at the input of pulse pair encoder 35, is illustrated in FIG. 6.

Referring again to FIG. 1, the aircraft reply signal is received by antenna 10 and passes through duplexer 26 to receiver 60, the output of which is decoded by pulse pair decoder 61 to produce the original reply signal of FIG. 6. This signal is applied to the identification unit 39 which has been supplied with the interrogated aircraft's address from the programming unit 22 over circuit 40. If the two addresses are in agreement a pulse is produced which is applied to and opens gate E long enough for the DME reply pulse, which was stored in the meantime in delay element 41, to pass through gate E to range unit 42, this unit having been supplied with the initially transmitted DME pulse over circuit 43. The range unit produces an electrical output proportional to the time interval between transmitted and received DME, less system delays, and therefore proportional to the slant range $\rho$. The construction of a typical range unit is explained in the earlier cited vol. 33 of Electrical Communication.

The aircraft reply signal at the output of decoder 61 is also applied to the input of altitude decoder 44, which changes the altitude from digital to analog form, and to the inputs of 15 and 135 c./s. sine wave generators 45 and 46. The signal radiated by the airborne equipment is a series of constant amplitude pulses. As this signal is received by antenna 10 it is amplitude modulated with 15 c./s. and 135 c./s. components due to the rotating cardioid pattern of the antenna, illustrated in FIG. 4. The pulses applied to generators 45 and 46 therefore have an envelope consisting of 15 c./s. and 135 c./s. components. The outputs of these elements are sine waves corresponding to the two envelopes and are applied to bearing unit 47. Also applied to the bearing unit are 15 c./s. and 135 c./s. reference sine waves derived by elements 48 and 49 from pulse signals of these frequencies induced in pickup devices 19 and 20 by the magnets of pulser plate 17. It will be evident that the phases of the sine waves derived from elements 45 and 46 relative to the reference sine waves will depend upon the bearing of the aircraft. The bearing unit determines the bearing of the aircraft by comparing the phases of the received waves with the reference waves. Since the period of the 135 c./s. wave covers only 40° of rotation of the antenna pattern, the 15 c./s. wave, which covers 360° of rotation, is used to resolve the resulting 9-fold ambiguity. The output of the bearing unit, which may be in electrical analog form, appears in output circuit 50. The details of a suitable bearing unit are described in the above cited volume of Electrical Communication.

After the range and bearing have been determined the beacon, under control of programming unit 22, radiates a reply to the aircraft, the form of which is as shown in FIG. 7. The slant range $\rho$ and the bearing $\theta$ are applied through gates 1 and 3, which were opened with gate E by the output of identification unit 39, to range encoder 51 and azimuth encoder 52. Here the range and bearing are converted from analog to digital form and applied to the programming unit. Closure of gate 3 causes gate 4 to open and admit the encoded beacon identification to the programming unit. Provision is also made to transmit the aircraft position in x—y coordinates in place of the range, bearing and beacon identification. This is accomplished by applying $\rho$, $\theta$ and the altitude to x—y converter 53 which derives the rectangular coordinates therefrom, this conversion being a matter of simple geometry. These coordinates are passed through gate 2 to x—y encoder 54 for conversion from analog to digital form and thence to programming unit 22. This unit selects the desired one of the two available forms of transmission. The latitude, longitude and altitude of the aircraft are transmitted to the TCC (traffic control center) over circuits 55, 56 and 57.

FIG. 8 illustrates an airway defined by a plurality of beacons supplying information to a traffic control center. Information and addresses are transmitted between the TCC and the beacons over suitable data links which may be radio or metallic circuits. Also, all beacons may be operated on the same frequency channels by sequencing their operation under the control of the traffic center via suitable radio or land line sequencing links. FIG. 9 illustrates a suitable sequencing pattern for five beacons.

Monitoring of the range and bearing determining apparatus of the beacon may be accomplished by a monitor transponder located at a known range and bearing as illustrated in FIG. 1. This transponder may be of the same type as that used in the aircraft and shown in FIG. 2.

I claim:

1. A traffic control system for aircraft comprising a beacon situated on the ground, a beacon antenna having a rotating pattern in the form of a cardioid with a sinuous outline, means for periodically transmitting from said antenna an interrogating signal containing a distance measuring pulse and the address of one of said aircraft, a transponder in each aircraft for receiving said interrogating signal, each transponder having means for comparing the address of its aircraft with the address in said interrogating signal and operative when the addresses agree to radiate to said beacon a signal in the form of a series of constant amplitude pulses one of which is a distance measuring pulse, means at said beacon including said antenna for receiving said constant amplitude pulse signal, means at said beacon for determining the range to said aircraft as a function of the time interval between the transmitted and received distance measuring pulses, and means at said beacon responsive to the wave components resulting from the amplitude modulation of said received constant amplitude pulse signal by said rotating antenna pattern for determining the bearing of said aircraft.

2. A traffic control system for aircraft comprising a beacon situated on the ground and a transponder in each aircraft, said beacon comprising an antenna having a pattern in the form of a cardioid with a sinuous outline, means for rotating said pattern at a constant rate, means for storing coded addresses for each aircraft to be controlled, means synchronized with said rotating pattern and cooperating with said address storage for periodically radiating from said antenna a first ground-to-air signal containing the address of one of said aircraft and a distance measuring pulse, means in each transponder for receiving said first signal and comparing its address with that of the associated aircraft, means operative when said addresses agree to radiate an air-to-ground signal containing the address of the aircraft and a distance measuring reply pulse, receiving means coupled to said beacon antenna for receiving said air-to-ground signal, a range unit at said beacon for determining the range to an aircraft as a function of the time interval between transmitted and received distance measuring pulses, means for applying the distance measuring pulse in said first signal to said range unit, means coupled to said receiver and operative when the address in the received signal agrees with the address in said first signal to apply the distance measuring pulse in said received signal to said range unit, means coupled to said receiver for deriving from said received signal frequency components resulting from the amplitude modulation of said received signal by said rotating antenna pattern, means cooperating with said antenna for deriving reference frequency components of the same frequency as said received signal derived components, means for determining the bearing of said aircraft by comparing the phases of said received signal derived components with the phases of said reference frequency components, and means coupled to said range unit and said bearing determining means for transmitting from said beacon antenna a second ground-to-air signal containing the same address as said first signal and the position of said aircraft.

3. Apparatus as claimed in claim 2 in which the last means transmits said aircraft position in terms of range and bearing from said beacon together with the identification of said beacon.

4. Apparatus as calimed in claim 2 in which the last means contains apparatus for converting range and bearing information into latitude and longitude whereby said aircraft position is transmitted in terms of latitude and longitude.

No references cited.